(12) United States Patent
Tanegashima et al.

(10) Patent No.: US 7,718,708 B2
(45) Date of Patent: May 18, 2010

(54) ANHYDROUS ZINC ANTIMONATE SOL AND PROCESS FOR PRODUCING SAME

(75) Inventors: Osamu Tanegashima, Sodegaura (JP); Tadayuki Isaji, Sodegaura (JP); Osamu Fujimoto, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 1362 days.

(21) Appl. No.: 11/107,931

(22) Filed: Apr. 18, 2005

(65) Prior Publication Data

US 2005/0239907 A1 Oct. 27, 2005

(30) Foreign Application Priority Data

Apr. 21, 2004 (JP) ............................. 2004-125751

(51) Int. Cl.
| | | |
|---|---|---|
| *B01F 3/12* | (2006.01) | |
| *C09K 3/00* | (2006.01) | |
| C09K 3/16 | (2006.01) | |
| C09C 1/04 | (2006.01) | |
| C09D 5/00 | (2006.01) | |
| C09D 5/32 | (2006.01) | |
| C09D 7/00 | (2006.01) | |
| C09D 7/12 | (2006.01) | |

(52) U.S. Cl. .......................................... 516/33; 516/36
(58) Field of Classification Search .................. 516/33, 516/88, 93, 36
See application file for complete search history.

(56) References Cited

U.S. PATENT DOCUMENTS 7,157,024 B2 * 1/2007 Isaji et al. ................ 252/519.1

FOREIGN PATENT DOCUMENTS

| EP | 0 686 600 A1 | 12/1995 |
|---|---|---|
| EP | 0 909 784 A1 | 4/1999 |
| EP | 0 927 700 A1 | 7/1999 |
| EP | 1491503 A2 * | 12/2004 |
| JP | A 6-219743 | 8/1994 |
| JP | A 11-314918 | 11/1999 |

* cited by examiner

Primary Examiner—Daniel S Metzmaier
(74) Attorney, Agent, or Firm—Oliff & Berridge, PLC

(57) ABSTRACT

There is provided a sol in which surface-modified colloidal particles are dispersed in a liquid, wherein the surface-modified colloidal particles are obtained by using anhydrous zinc antimonate colloidal particles, metal oxides comprising tin atom, zinc atom, antimony atom and oxygen atom, or tin oxide-doped anhydrous zinc antimonate colloidal particles as nuclei, and by coating the surface of the nuclei with an aluminum-containing substance (e.g., an aluminum chelating agent), a polymer type surfactant (e.g., a polycarboxylic acid ester or polyethylene glycol monoaliphatic acid ester surfactant) or both of them. The anhydrous zinc antimonate sol is used for several purposes such as transparent antistatic materials in the form of resin, plastic, glass, paper, magnetic tape or the like, transparent UV absorbers, transparent heat radiation absorbers, high refractive index hard coating agent, antireflective agent and the like.

21 Claims, No Drawings

ANHYDROUS ZINC ANTIMONATE SOL AND PROCESS FOR PRODUCING SAME

BACKGROUND OF THE INVENTION

1. Field of the Art

The present invention relates to a sol in which surface-modified colloidal particles are dispersed in a liquid, wherein the surface-modified colloidal particles are obtained by using anhydrous zinc antimonate colloidal particles, metal oxides comprising tin atom, zinc atom, antimony atom and oxygen atom, or tin oxide-doped anhydrous zinc antimonate colloidal particles as nuclei, and by coating the surface of the nuclei with an aluminum-containing substance, a polymer type surfactant or both of them. The anhydrous zinc antimonate sol according to the present invention is used for several purposes such as transparent antistatic materials in the form of resin, plastic, glass, paper, magnetic tape or the like, transparent UV absorbers, transparent heat radiation absorbers, high refractive index hard coating agent, anti-reflective agent and the like.

2. Description of the Related Art

There are disclosed aqueous sols or organic solvent sols of anhydrous zinc antimonate. These sols include aqueous sols or organic solvent sols of anhydrous zinc antimonate that are stabilized with alkyl amine such as ethyl amine, propyl amine, isopropyl amine, diisobutyl amine or the like, alkanol amine such as triethanol amine, monoethanol amine or the like, diamine such as ethylene diamine or the like, oxycarboxylic acid such as lactic acid, tartaric acid, malic acid, citric acid or the like. The organic solvents include alcohols such as methyl alcohol, ethyl alcohol, propyl alcohol, butyl alcohol or the like, glycols such as ethylene glycol, diethylene glycol or the like, cellosolves such as ethyl cellosolve, propyl cellosolve or the like, amides such as dimethyl formamide, dimethyl acetamide or the like (JP-A 6-219743).

In addition, there are also disclosed sols in which surface-modified colloidal particles are dispersed in a liquid, and contain amine and/or oxycarboxylic acid, wherein the surface-modified anhydrous zinc antimonate colloidal particles are obtained by using anhydrous zinc antimonate colloidal particles as nuclei, and by coating the surface of the nuclei with a silicon-containing substance (JP-A11-314918).

The organic solvent sols of anhydrous zinc antimonate and the related materials thereof are used for e.g., transparent antistatic paints or transparent heat radiation absorbing paints by utilizing the characteristics that are fine particles. In this case, paints are obtained by mixing organic solvent sols of anhydrous zinc antimonate and the related materials thereof with several resins. The resulting resins are required that the particles in the anhydrous zinc antimonate sol and the related metal oxide sol are not aggregated but are dispersed in a state close to primary particles. The solvents for resins used for the purpose are hydrophobic solvents such as toluene or xylene, alcohols with a high boiling point such as isopropyl alcohol or butyl alcohol. When the solvents with a law boiling point are present in a paint, the solvents cause whitening of the coating film due to flushing, or the like. Thus, it is generally preferable to replace methanol with the above-mentioned organic solvent. Consequently, hydrophobic solvents such as toluene or xylene or solvents with a high boiling point such as isopropyl alcohol or butyl alcohol are used for the organic solvent sols of anhydrous zinc antimonate used for transparent antistatic paints or transparent heat radiation absorbing paints that are obtained by mixing with several resins.

However, the organic solvent sol of anhydrous zinc antimonate stabilized by adding alkyl amine, alkanol amine, diamine and oxycarboxylic acid that is described in JP-A 6-219743 is deficient in dispersion properties of sol particles in a hydrophobic solvent such as toluene or xylene or a liquid mixed with each resin. Thus, when it is used for transparent antistatic paints or transparent heat radiation absorbing paints, it is required to improve further transparency.

SUMMARY OF THE INVENTION

Therefore, the present invention provides an organic solvent sol of anhydrous zinc antimonate in which anhydrous zinc antimonate particles are dispersed in a mixed liquid of UV curing resins or thermosetting resins such as polyvalent acrylate or urethane acrylate with an organic solvent for example a hydrophobic solvent such as toluene or xylene, or an alcohol with a high boiling point such as isopropyl alcohol or butyl alcohol, without aggregation of anhydrous zinc antimonate particles and in a state close to primary particles; and a production process of the organic solvent sol.

The present invention includes the following aspects:

as a first aspect, a sol in which surface-modified anhydrous zinc antimonate colloidal particles are dispersed in a liquid, wherein the surface-modified anhydrous zinc antimonate colloidal particles are obtained by using anhydrous zinc antimonate colloidal particles as nuclei, and by coating the surface of the nuclei with an aluminum-containing substance, a polymer type surfactant or both of them;

as a second aspect, a sol in which surface-modified metal oxide colloidal particles are dispersed in a liquid, wherein the surface-modified metal oxide colloidal particles are obtained by using as nuclei metal oxide particles comprising tin atom, zinc atom, antimony atom and oxygen atom, and having as molar ratio $SnO_2:ZnO:Sb_2O_5$ of 0.01-1.00:0.80-1.20:1.00, and by coating the surface of the nuclei with an aluminum-containing substance, a polymer type surfactant or both of them;

as a third aspect, the sol as set forth in the second aspect, wherein the metal oxide has a rutile-type structure, and is tin oxide-doped zinc antimonate of a formula: $[(ZnO)_x(Sb_2O_5)_y]_a(SnO_2)_b$ wherein $x:y=0.80-1.20:1$ and $a:b=1:0.01-0.30$;

as a fourth aspect, the sol as set forth in any one of the first to third aspects, wherein the aluminum-containing substance is an aluminum chelating agent:

as a fifth aspect, the sol as set forth in any one of the first to fourth aspects, wherein the anhydrous zinc antimonate or the metal oxide is coated with the aluminum-containing substance in an amount of 0.01 to 50% by weight in term of $Al_2O_3$ based on the anhydrous zinc antimonate or the metal oxide;

as a sixth aspect, the sol as set forth in any one of the first to fifth aspects, wherein the aluminum-containing substance is a compound of formula (1), (2) or (3):

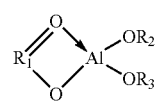

(1)

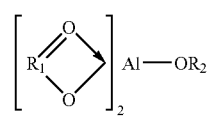

(2)

-continued

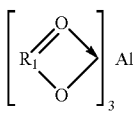
(3)

wherein $R_1$, $R_2$ and $R_3$ are organic groups;

as a seventh aspect, the sol as set forth in any one of the first to fifth aspects, wherein the aluminum-containing substance is a compound of formula (4), (5) or (6):

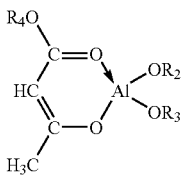
(4)

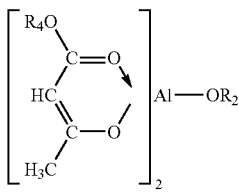
(5)

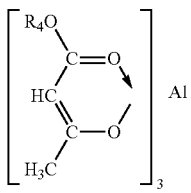
(6)

wherein $R_2$ and $R_3$ are organic groups, and $R_4$ is alkyl group;

as an eighth aspect, the sol as set forth in any one of the first to seventh aspects, wherein the polymer type surfactant is at least one selected from the group consisting of polycarboxylic acid ester type surfactants and polyethylene glycol monoaliphatic acid ester type surfactants;

as a ninth aspect, the sol as set forth in any one of the first to eighth aspects, wherein the anhydrous zinc antimonate or the metal oxide is coated with the polymer type surfactant in an amount of 0.1 to 50% by weight based on the anhydrous zinc antimonate or the metal oxide, as a tenth aspect, the sol as set forth in any one of the first to ninth aspects, wherein the polymer type surfactant is a substance having a structure of formula (7):

—(COO(CH$_2$)$_5$)$_{n1}$—  (7)

wherein n1 is an integer of 1 to 20, or a substance of formula (8):

—COO((CH$_2$)$_2$O)$_{n2}$—  (8)

wherein n2 is an integer of 1 to 20:

as an eleventh aspect, the sol as set forth in any one of the first to tenth aspects, wherein a dispersing medium is a hydrophobic organic solvent or a plasticizer;

as a twelfth aspect, a process for producing the sol as set forth in any one of the first to eleventh aspects comprising the steps of: mixing a sol with an aluminum-containing substance, a polymer type surfactant or both of them, and stirring the resulting mixture;

as a thirteenth aspect, the process as set forth in the twelfth aspect, which comprises mixing an aluminum-containing substance, a polymer type surfactant or both of them in at least one step in a series of steps of: producing an aqueous sol, replacing the aqueous solvent of the aqueous sol with a hydrophilic organic solvent, and replacing the hydrophilic organic solvent of the hydrophilic organic solvent sol with a hydrophobic organic solvent or a plasticizer.

The present invention relates to a sol comprising surface-modified anhydrous zinc antimonate colloidal particles, surface-modified metal oxide comprising tin atom, zinc atom, antimony atom and oxygen atom, or surface-modified tin oxide-doped anhydrous zinc antimonate colloidal particles.

The sol comprising surface-modified colloidal particles according to the present invention contains a hydrophobic organic solvent or a plasticizer as a medium, and the particles are not aggregated in the medium but dispersed in a-state close to primary particles.

By use of these properties, the sol can be utilized for e.g., transparent antistatic paints or transparent heat radiation absorbing paints.

DESCRIPTION OF THE PREFERRED EMBODIMENTS

The present invention relates to a sol in which surface-modified anhydrous zinc antimonate colloidal particles are dispersed in a liquid, wherein the surface-modified anhydrous zinc antimonate colloidal particles are obtained by using anhydrous zinc antimonate colloidal particles as nuclei, and by coating the surface of the nuclei with an aluminum-containing substance, a polymer type surfactant or both of them.

The anhydrous zinc antimonate used in the present invention may be ones obtained according to the known process. For example, anhydrous zinc antimonates obtained according to the process described in JP-A 6-219743 or JP-A 11-189416 can be preferably used.

They are produced by mixing a zinc compound with a colloidal antimony oxide in a molar ratio $ZnO/Sb_2O_5$ of 0.8-1.2 and then calcining the resulting mixture at a temperature of 500 to 1100° C., preferably calcining it in water vapor-containing air or nitrogen gas at a temperature of 300 to 680° C. In the production process zinc antimonate, in case where colloidal antimony oxide is antimony oxide sol, the aimed zinc antimonate is produced by mixing the antimony oxide sol with zinc compound, and drying the resulting mixture, then calcining it at a temperature of 500 to 1100° C., preferably calcining it in water vapor-containing air or nitrogen gas at a temperature of 300 to 680° C.

The above-mentioned zinc compound is at least one selected from the group consisting of zinc hydroxide, zinc oxide, inorganic acid salts of zinc and organic acid salts of zinc. The inorganic acid salts of zinc include zinc carbonate, basic zinc carbonate, zinc nitrate, zinc chloride, zinc sulfate and the like. In addition, the organic acid salts of zinc include zinc formate, zinc acetate, zinc oxalate and the like. These zinc compounds may be commercially available ones in technical grades. In case where zinc hydroxides or zinc oxides are used, they preferably have a primary particle diameter of 500 nm or less. In particular, salts with acid liable to be volatized by calcination, that is, carbonates and organic acid salts are preferable, and these compounds may be used alone or in a mixture thereof.

The colloidal antimony oxides have a primary particle diameter of 300 nm or less, and include diantimony pentoxide sol, hexa-antimony tridecaoxide sol, hydrated diantimony tetraoxide sol, colloidal diantimony trioxide sol and the like. Diantimony pentoxide sol can be produced by known processes, for example a process comprising oxidizing diantimony trioxide (JP-B 57-11848), a process comprising subjecting an alkali antimonate to alkali ion extraction with an ion exchange resin (U.S. Pat. No. 4,110,247), a process comprising treating a sodium antimonate with an acid (JP-A 60-41536 and 62-182116) and so on. Hexa-antimony tridecaoxide sol can be produced by a process comprising oxidizing diantimony trioxide (JP-A 62-125849), and hydrated diantimony tetraoxide sol can be also produced by a process comprising oxidizing diantimony trioxide (JP-A 52-21298). Colloidal diantimony trioxide can be produced by a gas phase method (JP-A 61-3292). The antimony oxide sol has a primary particle diameter of 2 to 200 nm, preferably 2 to 40 nm, and an acidic sol containing no base such as amines or alkaline metals is particularly preferable. The antimony oxide sol may be used in antimony oxide ($Sb_2O_5$, $Sb_6O_{13}$ or $Sb_2O_4$) concentration of 1 to 60% by weight, and may be used in a dried form manufactured by drying the antimony oxide sol with spray drying, vacuum drying or freeze-drying. The above-mentioned colloidal antimony oxide may be commercially available ones in technical grades in a shape of diantimony pentoxide sol, diantimony pentoxide powder or super fine diantimony trioxide powder.

When antimony oxide used as starting material is converted into an electrically conductive zinc antimonate by calcining it with a zinc compound, a little change in the particle diameter thereof occurs. Therefore, the particle diameter of antimony oxide can be selected from broader region than that of the products. In case where a diantimony pentoxide sol is used as starting material, for example ZnO-doped diantimony pentoxide sol produced by dispersing diantimony trioxide and a basic zinc carbonate in water in a $ZnO/Sb_2O_3$ molar ratio of 0.01 to 0.2 and reacting with hydrogen peroxide can be used as starting material. In this case, doped ZnO is included in a $ZnO/Sb_2O_5$ molar ratio of 0.8 to 1.2 of the finally obtained electrically conductive anhydrous zinc antimonate.

The mixing of the zinc compound with the antimony oxide sol can be carried out by using an apparatus such as Satake agitator, Pfaudler agitator or a disperser at a mixing temperature of 0 to 100° C. for a mixing time of 0.1 to 30 hours. The mixing of the zinc compound with a dried material of antimony oxide sol or a colloidal antimony oxide can be carried out with an apparatus such as a mortar, a twin shaft mixer, Henschel mixer or a ball mill.

In the present invention, it is preferable to mix the zinc compound with an antimony oxide sol or the dried material thereof, or a colloidal diantimony trioxide in a molar ratio of 0.8 to 1.2. The drying of the mixture (slurry) of zinc compound with antimony oxide sol can be carried out with a spray dryer, a drum dryer, a box type hot-air dryer, a vacuum dryer, a freeze dryer or the like at a temperature of 500° C. or less. In addition, the slurry is separated through filtration with suction, centrifugal filtration, filter press or the like, and in some cases, soluble impurities ($SO_4$ or the like that is not liable to be vaporized when is heated) in the starting material are removed with water-pouring wash to obtain a wet cake, and then the cake can be dried with the above-mentioned box type hot-air dryer, etc. at room temperature to 500° C. The drying is preferable to be done at a temperature of 300° C. or less from viewpoint of apparatus or handling.

In the present invention, the dried material of mixture of zinc compound with antimony oxide sol or the mixture of zinc compound with a dried material of antimony oxide sol or a colloidal diantimony trioxide is calcined at a temperature of 500 to 1100° C., preferably at a temperature of 550 to 900° C. for 0.5 to 50 hours, preferably 2 to 20 hours. In addition, it is carried out in a gas containing water vapor at a temperature of 300 to 680° C., preferably at a temperature of not less than 350° C. to less than 500° C., most preferably at a temperature of not less than 400° C. to less than 500° C., for 0.5 to 50 hours, preferably 2 to 20 hours. In this case, a temperature of not less than 400° C. to less than 500° C. is most preferably as it affords a sol having an excellent electrical conductivity and little aggregation.

The mixing of water vapor is carried out at 100° C. or more in order to prevent dew condensation. As the gas, an oxidizing gas, a reducing gas and an inert gas can be used, for example the oxidizing gas includes oxygen, air, a mixed gas of oxygen and air or a mixed gas of nitrogen and air, the reducing gas includes hydrogen or carbon monoxide, and the inert gas includes nitrogen, carbonic acid gas, helium or argon. In particular, it is preferable to use air or nitrogen.

The partial pressure ratio of water vapor and gas is 0.05 to 2, preferably 0.1. to 1.0 in term of (partial pressure of water vapor)/(partial pressure of gas). The partial pressure ratio of water vapor and gas is controlled by a method comprising bubbling gas in a hot water bath to control the partial pressure of water vapor depending on the temperature of the hot water bath, or directly mixing gas and water vapor at a temperature of 100° C. or more to control the partial pressure ratio of gas and water vapor.

The above-mentioned calcination affords an anhydrous zinc antimonate through solid phase reaction. The anhydrous zinc antimonate shows white to deep blue color depending on calcination condition. When the calcination is carried out at a temperature of 500 to 680° C. or in a gas containing water vapor at a temperature of 300 to 680° C., the resulting anhydrous zinc antimonate shows blue-green to deep blue color, has a resistance of 0.1 k$\Omega$ to 1 M$\Omega$, and shows electrical conductivity due to electronic conduction. In addition, products obtained by pressing at 300 kg/cm$^2$ have a specific resistivity of 1 $\Omega$·cm to 1 M$\Omega$·cm.

X-ray diffraction measurements show that the electrically conductive anhydrous zinc antimonate obtained by the above-mentioned process coincides with the zinc antimonate indicated in ASTM (Index to the X-ray Powder Data File Inorganic) (ASTM No. 3-0455 is $ZnSb_2O_6$, No. 11-214 is $Zn(SbO_3)_2$) in the X-ray diffraction peaks, shows no diffraction peak of zinc oxide or anhydrous diantimony pentaoxide, and has $ZnSb_2O_6$ structure. It becomes clear that the X-ray diffraction peaks of the anhydrous zinc antimonate are present at lower diffraction angle side than the peak position indicated in ASTM and that the anhydrous zinc antimonate has an open structure. Also, the X-ray diffraction peaks coincide with those indicated in ASTM in diffraction angle. In addition, it is confirmed by differential thermal analysis that the anhydrous zinc antimonate shows no weight reduction at room temperature to 1000° C. and is anhydrous zinc antimonate without crystal water.

It is confirmed by the observation with transmission electron microscope that the zinc antimonate having electrical conductivity has a primary particle diameter of 5 to 500 nm, and therefore is fine particle in a level of colloid.

The anhydrous zinc antimonate can easily afford an aqueous sol by wet-grinding it in water with a sand grinder, a ball mill, a homogenizer, a disperser, a colloid mill or the like. In addition, the anhydrous zinc antimonate does not afford water-containing salt even by grinding or warming in water but remains anhydrous.

The aqueous sol after wet-grinding can be subjected to deionization process to produce a sol with a high transparency. The deionization process is accomplished by anion exchange and/or cation exchange. The deionization process can be carried out by passing the aqueous sol after wet-grinding in an anion exchange resin and/or a cation exchange resin.

The sol obtained by subjecting the aqueous sol after wet-grinding to the deionization process can be used in the present invention. Further, the deionized aqueous sol can afford a sol with higher transparency by alkaline maturing. The alkaline maturing can be accomplished by adding an inorganic base such as caustic potash or caustic soda or an organic base such as alkylamine to a deionized aqueous sol to adjust pH to 8 to 13, and warming the aqueous sol adjusted alkaline condition at a temperature of 60 to 100° C. The deionized aqueous sol and/or alkaline matured aqueous sol can afford an organosol by organic solvent replacement. The resulting organosol can be preferably used in the present invention.

When it is required to raise the concentration of anhydrous zinc antimonate in the above-mentioned anhydrous zinc antimonate aqueous sol, the sol can be concentrated maximally to ca. 50% by weight by conventional methods, for example evaporation, ultrafiltration or the like. In addition, when it is required to adjust pH of the sol, an alkali metal, an organic base (amine), oxycarboxylic acid or the like can be added to the sol. The pH adjustment can be carried out before concentration and/or after concentration. The alkali component includes for example hydroxides of alkali metal such as Li, Na, K, Rb, Cs or the like, $NH_4$, alkylamine such as ethylamine, triethylamine, isopropylamine, n-propylamine or the like, aralkyl amine such as benzylamine or the like, alicyclic amine such as piperidine or the like, alkanol amine such as monoethanol amine, triethanol amine or the like. These components may be in a mixture of two or more. Particularly, sols having total concentration of metal oxides of 10 to 40% by weight are practically preferable. When ultrafiltration is used as concentration process, very fine particles and the like coexisting in the sol are passed away together with water through ultrafiltration membrane, and thereby very fine particles and the like being responsible for destabilizing sols can be removed from the sols.

The anhydrous zinc antimonate aqueous sol obtained by adjusting pH with an addition of the above-mentioned alkali metal, organic base (amine), oxycarboxylic acid or the like can afford an organosol by replacing the aqueous medium of the aqueous sol with a hydrophilic organic solvent. The solvent replacement can be carried out by a general process such as distillation, ultrafiltration or the like. The hydrophilic organic solvent includes for example alcohols such as methyl alcohol, ethyl alcohol, propyl alcohol, 2-propyl alcohol, butyl alcohol or the like, glycols such as ethylene glycol, diethylene glycol, hexylene glycol or the like, ethers such as methyl cellosolve, ethyl cellosolve or the like, straight-chain amides such as dimethyl formamide, N,N'-dimethyl acetamide or the like, cyclic amides such as N-methyl-2-pyrrolidone or the like, ketones such as methyl ethyl ketone or the like, hydrocarbons such as xylene, toluene or the like.

When the sol of the metal oxide particle is produced by using high boiling point solvents such as 2-propyl alcohol, ethylene glycol, methyl ethyl ketone, toluene or the like as dispersion medium, it is preferable to replace the solvent of the sol prepared by using methanol as dispersion medium with a high boiling point solvent.

Also, the present invention relates to a sol in which surface-modified metal oxide colloidal particles are dispersed in a liquid, wherein the surface-modified metal oxide colloidal particles are obtained by using as nuclei metal oxide particles comprising tin atom, zinc atom, antimony atom and oxygen atom, and having as molar ratio $SnO_2:ZnO:Sb_2O_5$ of 0.01-1.00:0.80-1.20:1.00, and by coating the surface of the nuclei with an aluminum-containing substance, a polymer type surfactant or both of them.

The metal oxide may have a rutile-type structure, and be tin oxide-doped zinc antimonate of a formula: $[(ZnO)_x(Sb_2O_5)_y]_a(SnO_2)_b$ wherein $x:y=0.80-1.20:1$ and $a:b=1:0.01-0.30$.

In the present invention, a metal oxide particle comprising tin atom, zinc atom, antimony atom and oxygen atom, having a molar ratio $SnO_2:ZnO:Sb_2O_5$ of 0.01-1.00:0.80-1.20:1.00, preferably 0.02-0.10:0.80-1.20:1.00 and having a primary particle diameter of 5 to 500 nm can be used.

In this specification, the primary particle diameter does not mean a diameter of the metal oxide particles in a aggregated state but a diameter of one metal oxide particle separated individually, and is determined with electron microscope observation.

The metal oxide particle can be produced according to a process comprising the steps of: mixing a tin compound, a zinc compound and an antimony compound in a molar ratio $SnO_2:ZnO:Sb_2O_5$ of 0.01-1.00:0.80-1.20:1.00; and calcining the mixture in the atmosphere, several gases or a gas containing water vapor at a temperature of 300 to 900° C. after drying.

The tin compound used in the present invention is preferably one or more selected from the group consisting of oxides of tin, inorganic acid salts of tin, organic acid salts of tin and stannates. The oxides of tin include tin (II) oxide, tin (IV) oxide, metastannic acid and the like. The inorganic acid salts of tin include tin (II) chloride, tin (IV) chloride, tin (II) sulfate and the like. The organic acid salts of tin include tin oxalate, tin octylate and the like. The stannates include potassium stannate, sodium stannate and the like. These tin compounds may be commercially available ones in technical grades. In case where salts of tin are used, salts with acid liable to be volatized by calcination, that is carbonates and organic acid salts are preferable, and these compounds may be used alone or in a mixture thereof. Further, these tin compounds may be used in a solution prepared by dispersing or dissolving them in an aqueous solution or an organic solvent, or in a powder state.

The zinc compound used in the present invention is one or more selected from the group consisting of hydroxides of zinc, oxides of zinc, inorganic acid salts of zinc and organic acid salts of zinc. The hydroxides of zinc include zinc hydroxide, and the oxides of zinc include zinc oxide. The inorganic acid salts of zinc include zinc carbonate, basic zinc carbonate, zinc nitrate, zinc chloride, zinc sulfate and the like. In addition, the organic acid salts of zinc include zinc formate, zinc acetate, zinc oxalate and the like. These zinc compounds may be commercially available ones in technical grades. In case where zinc hydroxides or zinc oxides are used, they preferably have a primary particle diameter of 100 nm or less. In case where salts of zinc are used, salts with acid liable to be volatized by calcination, that is carbonates and organic acid salts are preferable, and these compounds may be used alone or in a mixture thereof. These zinc compounds may be used in a solution prepared by dispersing or dissolving them in an aqueous solution or an organic solvent, or in a powder state.

The antimony compound used in the present invention is preferably colloidal antimony oxides having a primary particle diameter of 100 nm or less, and include diantimony pentoxide sol, hexa-antimony tridecaoxide sol, hydrated diantimony tetraoxide sol, colloidal diantimony trioxide sol and the like.

Diantimony pentoxide sol can be produced by known processes, for example a process comprising oxidizing diantimony trioxide (JP-A 57-11848), a process comprising subjecting an alkali antimonate to alkali ion extraction with an ion exchange resin (U.S. Pat. No. 4,110,247), a process comprising treating a sodium antimonate with an acid (JP-A 6041536 and JP-A 62-182116) and so on. Hexa-antimony tridecaoxide sol can be produced by a process comprising oxidizing diantimony trioxide (JP-A 62-125849), and hydrated diantimony tetraoxide sol can be also produced by a process comprising oxidizing diantimony trioxide (JP-A 52-21298). Colloidal diantimony trioxide can be produced by a gas phase method (JP-A 61-3292).

The antimony oxide sol used in the present invention has a primary particle diameter of 2 to 100 nm, preferably 2 to 50 nm, and an acidic sol containing no base such as amines or alkaline metals is particularly preferable. The antimony oxide sol may be used in antimony oxide ($Sb_2O_5$, $Sb_6O_{13}$ or $Sb_2O_4$) concentration of 1 to 60% by weight, and may be used in a dried form manufactured by drying the antimony oxide sol with spray drying, vacuum drying or freeze-drying. The above-mentioned colloidal antimony oxide may be commercially available ones in technical grades in a shape of diantimony pentoxide sol, diantimony pentoxide powder or super fine diantimony trioxide powder.

When antimony oxide used as starting material is converted into a metal oxide particle by calcining it with a tin compound and a zinc compound, a little change in the particle diameter thereof occurs. Therefore, the particle diameter of antimony oxide can be selected from broader region than that of the products.

In case where a diantimony pentoxide sol is used as starting material, for example ZnO-doped diantimony pentoxide sol produced by dispersing diantimony trioxide and a basic zinc carbonate in water in a $ZnO/Sb_2O_3$ molar ratio of 0.01 to 0.2 and reacting with hydrogen peroxide can be used as starting material. In this case, doped ZnO is included in the molar ratio of the finally obtained metal oxide particle.

The mixing of the tin compound and the zinc compound with the antimony oxide sol can be carried out by using an apparatus such as Satake agitator, Pfaudler agitator or a disperser at a mixing temperature of 0 to 100° C. for a mixing time of 0.1 to 30 hours. The mixing of the tin compound and zinc compound with a dried material of antimony oxide sol or a colloidal diantimony trioxide can be carried out with an apparatus such as a mortar, a twin shaft mixer, Henschel mixer or a ball mill.

In the present invention, an aqueous slurry comprising tin compound, zinc compound and antimony compound in a molar ratio $SnO_2:ZnO:Sb_2O_5$ of 0.01-1.00:0.80-1.20:1.00 is formed and then the slurry is dried and calcined at a predetermined temperature.

The slurry is preferably formed by for example mixing the tin compound and the zinc compound with the antimony oxide sol or the dried material thereof or the colloidal diantimony trioxide. In the present invention, the drying of the mixture (slurry) of tin compound and zinc compound with antimony oxide sol can be carried out with a spray dryer, a drum dryer, a box type hot-air dryer, a vacuum dryer, a freeze dryer or the like. In the meantime, the drying temperature is not specifically limited, but is preferably 300° C. or less from the standpoint of an apparatus to be used or operation thereof. In addition, the slurry is separated through filtration with suction, centrifugal filtration, filter press or the like, and in some cases, soluble impurities in the starting material are removed with water-pouring wash to obtain a wet cake, and then the cake can be dried with the above-mentioned dryer, etc.

When an aqueous slurry comprising antimony compound, tin compound and zinc compound is produced in the present invention, there are cases where the tin compound is lower in solubility than the zinc compound. For example, in case where a diantimony pentoxide sol, a metastannic acid and a basic zinc carbonate are used as starting material, a homogeneous slurry can be obtained by adding the metastannic acid in the diantimony pentoxide sol by making use of ion exchange efficiency of the diantimony pentoxide, and then adding the basic zinc carbonate thereto to an aqueous slurry.

An aqueous hydrogen peroxide and an organic acid can be added in the slurry in order to accelerate a reaction of the antimony compound, tin compound and zinc compound therein. This can afford a more homogeneous slurry. Consequently, as a lowering in the temperature of calcination is attained, particle growth is inhibited, and the improvement in transparency, electrical conductivity and heat radiation absorptivity of a coat liquid containing the metal oxide particle having electrical conductivity and heat radiation absorptivity is attained. The amount of hydrogen peroxide is not specifically limited, but is generally used in $H_2O_2/Sb_2O_5$ molar ration of 0.1 to 10.

As the above-mentioned organic acid, one containing a small number of carbon atoms is used from the viewpoint of solubility to an aqueous medium. For example, organic acids such as formic acid, acetic acid or propionic acid are preferably used. The organic acids are added in organic acid/$Sb_2O_5$ molar ration of 0.005 to 0.5.

In the present invention, the dried material of mixture of tin compound and zinc compound with antimony oxide sol or the mixture of tin compound and zinc compound with a dried material of antimony oxide sol or a colloidal diantimony trioxide is calcined in the atmosphere, several gases or a gas containing water vapor at a temperature of 300 to 900° C., preferably at a temperature of 400 to 600° C. for 0.5 to 50 hours, preferably 2 to 10 hours. This calcination affords metal oxide particles having a rutile-type structure by a reaction of tin oxide, zinc oxide and antimony oxide according to solid phase reaction.

The calcination can be carried out in the atmosphere, and can be carried out in a flow of several gases or a gas containing water vapor.

As several gases, an oxidizing gas, a reducing gas and an inert gas can be used. The oxidizing gas includes for example oxygen, air, a mixed gas of nitrogen and oxygen. The reducing gas includes hydrogen, carbon monoxide, a mixed gas of hydrogen and nitrogen and the like. The inert gas includes nitrogen, carbon dioxide, helium, argon and the like.

In case where a gas containing water vapor is used in the calcination, the mixing of water vapor is carried out at a temperature of 100° C. or more for preventing the formation of any condensation. As gas to which water vapor is added, an oxidizing gas, a reducing gas and an inert gas can be used. The oxidizing gas includes for example oxygen, air, a mixed gas of nitrogen and oxygen. The reducing gas includes hydrogen, carbon monoxide, a mixed gas of hydrogen and nitrogen and the like. The inert gas includes nitrogen, carbon dioxide, helium, argon and the like. Among them, it is preferable to use air and nitrogen.

The partial pressure ratio of water vapor and gas is 0.05 to 2.0, preferably 0.1 to 1.0 in terms of (partial pressure of water vapor)/(partial pressure of gas). The control of the partial pressure ratio between gas and water vapor is carried out by a method in which a gas is bubbled into a warmed bath and the partial pressure of water vapor is controlled based on the temperature of the warmed bath, or a method in which the partial pressure ratio of gas and water vapor is controlled by directly mixing the gas and the water vapor at a temperature of 100° C. or more.

The present invention leads to a lowering in calcination temperature by calcining in a gas containing water vapor. Consequently, particle growth is inhibited, and the improvement in transparency, electrical conductivity and heat radiation absorptivity of a coat liquid containing the metal oxide particle having electrical conductivity and heat radiation absorptivity is attained.

The metal oxide particle according to the present invention shows green to deep blue color. It is confirmed that the metal oxide particle obtained according to the process of the present invention has a rutile-type structure from X-ray diffraction peak.

The metal oxide particle has a rutile-type structure and is tin oxide-doped zinc antimonate of a formula $$[(ZnO)_x(Sb_2O_5)_y]_a(SnO_2)_b$$

wherein x:y=0.80-1.20:1 and a:b=1:0.01-0.30.

In addition, the metal oxide particle has a rutile-type structure, and is composed of tin oxide and zinc antimonate which are represented by a formula $$[(ZnO)_x(Sb_2O_5)_y]a(SnO_2)_b$$

wherein x:y=0.80-1.20:1 and a:b=1:0.30-1.00.

Further, the metal oxide particle according to the present invention is confirmed from the observation with transmission electron microscope to have a primary particle diameter of 5 to 500 nm, preferably 5 to 300 nm, more preferably 5 to 50 nm and to be a fine particle at a colloidal level.

And, the metal oxide particle according to the present invention is confirmed to have a specific resistance of 10 to 1000 Ω·cm when it is pressed at 300 kg/cm². Therefore, the metal oxide particle is confirmed that it is an electrically conductive oxide particle having a good conduction of electricity.

The metal oxide particle manufactured according to the present invention can afford an aqueous sol or an organic solvent sol easily by wet-grinding it in water or an organic solvent with a sand grinder, a ball mill, a homogenizer, a disperser, a colloid mill, an ultrasonic homogenizer, a high-pressure homogenizer or the like.

In the present invention, an aqueous sol containing metal oxide particle in higher purity can be optionally provided by contacting an aqueous sol of the resulting metal oxide particle with an ion exchange resin to remove impurity ions.

In case where a sol of water or an organic solvent is produced by wet-grinding the metal oxide particle according to the present invention, the sol can be optionally stabilized with addition of ammonia, hydroxides of alkali metal, ketones such as acetone, methyl ethyl ketone or diacetone alcohol, β-diketones such as acetyl acetone or acetonyl acetone, esters such as acetoacetic acid ester, lactic acid ester, 2-methoxyethyl acetate or 2-ethoxyethyl acetate, ethers such as methyl cellosolve, ethyl cellosolve, butyl cellosolve or propylene glycol monomethyl ether, heterocyclic compounds such as furfuryl alcohol, tetrahydro furfuryl alcohol or N-methylpyrrolidone, inorganic acids such as hydrochloric acid or nitric acid, oxycarboxylic acids such as lactic acid, tartaric acid, malic acid or citric acid.

In the present invention, an organic solvent sol can be obtained by replacing the medium of an aqueous sol of the metal oxide particle with the above-mentioned organic solvent. Even after replacing medium with the organic solvent, the particle diameter of the metal oxide particle in the organic solvent is almost identical to that of the metal oxide particle in the aqueous sol.

As the organic solvent, the followings can be used: alcohols such as methyl alcohol, ethyl alcohol, propyl alcohol, 2-propyl alcohol or butyl alcohol, glycols such as ethylene glycol, diethylene glycol or hexylene glycol, ethers such as methyl cellosolve or ethyl cellosolve, ketones such as methyl ethyl ketone, hydrocarbons such as xylene or toluene.

When the sol of the metal oxide particle is produced by using high boiling point solvents such as 2-propyl alcohol, ethylene glycol, methyl ethyl ketone or toluene as dispersion medium, it is preferable to replace the solvent of the sol prepared by using methanol as dispersion medium with a high boiling point solvent.

In addition, when the sol of the metal oxide particle is produced by using ketones such as methyl ethyl ketone, or aromatic hydrocarbons such as toluene, a high boiling point solvent sol with high dispersion properties can be obtained by adding relatively high boiling point solvents such as 2-propyl alcohol to form a mixed solvent system.

Further, by applying ultrasonic wave to the high boiling point solvent sol, the sol in which the metal oxide particle is highly dispersed can be obtained. The application of ultrasonic wave can be carried out by putting a container in which the sol is placed in an ultrasonic wave generator.

The metal oxide particle according to the present invention or the sol containing the same can be used as a transparent antistatic agent, a coat agent having antistatic properties, a transparent electromagnetic wave shielding agent, an electrically viscous fluid or the like by mixing it with silicon compounds, methacrylates polymerizable with activated energy radiation, resin emulsions, water soluble polymer solutions, silicone oil, coatings or the like to produce a coating composition.

The present invention provides a sol in which surface-modified anhydrous zinc antimonate colloidal particles or metal oxide colloidal particles are dispersed in a liquid, wherein the surface-modified colloidal particles are obtained by using anhydrous zinc antimonate colloidal particles or metal oxide colloidal particles as nuclei, and by coating the surface of the nuclei with an aluminum-containing substance and/or a polymer type surfactant, and the surface-modified colloidal particles are obtained by mixing the above-mentioned anhydrous zinc antimonate sol or metal oxide sol with the aluminum-containing substance and/or polymer type surfactant, and stirring the resulting mixture.

In the sol according to the present invention, the surface-modified colloidal particles can be obtained by coating the anhydrous zinc antimonate ($ZnO \cdot Sb_2O_5$) or the metal oxide particles having as molar ratio $SnO_2:ZnO:Sb_2O_5$ of 0.01-1.00:0.80-1.20:1.00 with the aluminum-containing substance in an amount of 0.01 to 50% by weight, preferably 0.05 to 10% by weight in term of $Al_2O_3$.

In case where the amount of the aluminum-containing substance is less than 0.05% by weight, the surface of the anhydrous zinc antimonate or metal oxide particles can be fully coated with the aluminum-containing substance. On the other hand, although the amount is influenced by the particle diameter of the anhydrous zinc antimonate particles or the metal oxide particles, in case where the amount is over 10% by weight, the aluminum-containing substance is superposed several times on the surface of the particles. When the resulting sol is used as an antistatic agent, these polymer may form an insulating layer, lead to a lowering in electrical conductivity and cause a lowering in antistatic properties.

It is preferable to use aluminum chelating agents as the aluminum-containing substance.

The aluminum chelating agent includes for example the compound of formula (1), preferably alkylacetoacetate aluminum di-isopropylate, alkylacetoacetate aluminum di-ethylate, alkylacetoacetate aluminum dimethylate, alkylacetoacetate aluminum dibutylate or aluminum mono-isopropoxy mono-oleoxyethylacetate corresponding to the compound of formula (4), $R_1$, $R_2$ and $R_3$ are organic groups and $R_4$ is alkyl group. $R_2$ and $R_3$ may be the same organic groups or different from each other.

In addition, the compounds of formula (2) are preferably bis(alkylacetoacetate) aluminum isopropylate, bis(alkylacetoacetate) aluminum ethylate, bis(alkylacetoacetate) aluminum methylate or bis(alkylacetoacetate) aluminum butylate corresponding to the compound of formula (5), $R_1$ and $R_2$ are organic groups and $R_4$ is alkyl group.

Further, the compound of formula (3) are preferably aluminum tris(ethylacetoacetate), aluminum mono-acetylacetonate bis(ethylacetoacetate) or aluminum tris(acetylacetonate) corresponding to the compound of formula (6), and $R_4$ is alkyl group.

Among these aluminum-containing substances, the compounds having the structure of formula (1), and having a lipophilic group in the moiety of $R_1$ are preferable. The concrete compounds of formula (4) are compounds in which the alkyl moiety of $R_4$ is $C_{2-30}$ alkyl group, or compounds having an aromatic hydrocarbon group, such as benzene, naphthalene or the like, or compounds in which $R_2$ and $R_3$ are a saturated or unsaturated alkyl group such as methyl ($CH_3$—), ethyl ($CH_3CH_2$—), propyl ($CH_3CH_2$ $CH_2$—), isopropyl (($CH_3$)$_2$CH—), isopropenyl ($CH_2$=C($CH_3$)—), nonyl ($CH_3$ ($CH_2$)$_7CH_2$—), octadecyl ($CH_3(CH_2)_{16}CH_2$—), oleoxyl ($CH_3(CH_2)_7CH$=CH($CH_2$)$_8$—) or the like, and for example alkylacetoacetate aluminum di-isopropylate.

The following compounds are preferably exemplified: ethylacetoacetate aluminum di-isopropylate wherein the alkyl group $R_4$ is ethyl and $R_2$ and $R_3$ are isopropyl (trade name: ALCH-50F, ALCH-75 manufactured by Kawaken Fine Chemicals Co., Ltd.), octadecylacetoacetate aluminum di-isopropylate wherein the alkyl group $R_4$ is octadecyl and $R_2$ and $R_3$ are isopropyl (trade name: Alumichelate M manufactured by Kawaken Fine Chemicals Co., Ltd.).

In addition, preferable compounds having the structure of formula (1) include for example aluminum mono-isopropoxy monooleoxy ethylacetoacetate wherein $R_4$ is ethyl, $R_2$ is isopropyl and $R_3$ are oleoxyl (trade name: Alumichelate OL manufactured by Kawaken Fine Chemicals Co., Ltd.).

In the compound of formula (1), two alkoxy groups are reacted with hydroxy groups on the surface of the inorganic substance, in case where M is antimony atom or zinc atom, a bond close to M—O—Al is formed, and the alkyl moiety originated from remaining one alkyl ($C_{2-30}$)acetoacetate group has lipophilic property, thereby the compound can be effectively dispersed in a hydrophobic organic solvent or a plasticizer.

In the sol according to the present invention, the surface-modified colloidal particles can be obtained by coating the anhydrous zinc antimonate ($ZnO \cdot Sb_2O_5$) or the metal oxide particles having as molar ratio $SnO_2:ZnO:Sb_2O_5$ of 0.01-1.00:0.80-1.20:1.00 with the polymer type surfactant in an amount of 0.1 to 50% by weight, preferably 0.1 to 10% by weight.

In case where the amount of the polymer type surfactant is less than 0.1% by weight, the surface of the anhydrous zinc antimonate or metal oxide particles can be fully coated with the polymer type surfactant. On the other hand, although the amount is influenced by the particle diameter of the anhydrous zinc antimonate particles or the metal oxide particles, in case where the amount is over 50% by weight, the polymer type surfactant is superposed several times on the surface of the particles. When the resulting sol is used as an antistatic agent, these polymer type surfactants may form an insulating layer, lead to a lowering in electrical conductivity and cause a lowering in antistatic properties.

The polymer type surfactant used in the present invention is for example polymer type surfactant of polycarboxylic acid ester having at least a structure of formula (7):

  (7)

wherein n1 is an integer of 1 to 20.

The polymer type surfactant of polycarboxylic acid ester is a substance having at least a structure of formula (9):

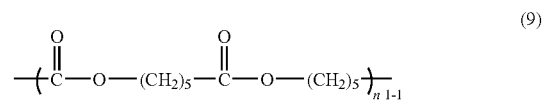  (9)

wherein n1 is an integer of 2 to 20.

As the polymer type surfactant used in the present invention is suitably used for organosols, it is preferably oil surfactant.

The polymer type surfactant of polycarboxylic acid ester can be represented by formula (10):

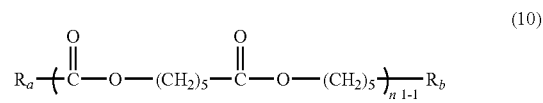  (10)

wherein n1 has the same meaning above.

In formula (10), $R_a$ and $R_b$ are independently of each other hydrogen atom, hydroxy, hydrocarbon group or aromatic group. In case where it used as oil surfactant, preferably Ra and Rb are independently of each other $C_{1-20}$ saturated or unsaturated linear or cyclic hydrocarbon group, or $C_{4-12}$ aromatic group, for example methyl, ethyl, propyl, vinyl, cyclohexyl, phenyl, tolyl, benzyl, naphthyl or the like.

In, addition, the polymer type surfactant used In the present invention may be polymer type surfactant of polyethylene glycol monoaliphatic acid ester having at least a structure of formula (8):

  (8)

wherein n2 is an integer of 1 to 20.

The polymer type surfactant of polyethylene glycol monoaliphatic acid ester is a substance having at least a structure of formula (11):

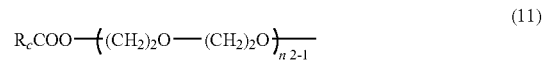  (11)

wherein n2 is an integer of 2 to 20.

As the polymer type surfactant used in the present invention is suitably used for organosols, it is preferably oil surfactant.

The polymer type surfactant of polyethylene glycol monoaliphatic acid ester can be represented by formula (12):

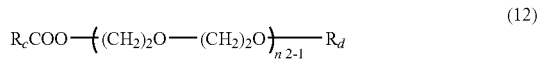

(12)

In formula (12), $R_c$ is preferably $C_{1-20}$ saturated or unsaturated linear or cyclic hydrocarbon group, or $C_{4-12}$ aromatic group, for example methyl, ethyl, propyl, vinyl, cyclohexyl, phenyl, tolyl, benzyl, naphthyl or the like.

$R_d$ is hydrogen atom, hydroxy, hydrocarbon group or aromatic group. In case where it used as oil surfactant, preferably $R_d$ is $C_{1-20}$ saturated or unsaturated linear or cyclic hydrocarbon group, or $C_{4-12}$ aromatic group, for example methyl, ethyl, propyl, vinyl, cyclohexyl, phenyl, tolyl, benzyl, naphthyl or the like. And, for the purpose of using as oil surfactant, it preferably contains short ethyleneoxide chains, and n2 is suitably 6 to 13.

As the polymer type surfactant used in the present invention, at least one substance selected from the group consisting of formulae (7) to (12) can be used.

The liquid as dispersion medium in the sol according to the present invention is preferably an organic solvent, and particularly a hydrophobic organic solvent, thereby a sol in which the surface-modified anhydrous zinc antimonate or metal oxide is dispersed in the hydrophobic organic solvent can be obtained. In case where the dispersing medium of the anhydrous zinc antimonate sol or metal oxide sol that the surface thereof is modified with the aluminum-containing substance and/or polymer type surfactant is a hydrophilic organic solvent, it is preferable to replace the solvent with a hydrophobic organic solvent. The replacement can be carried out by a general process such as distillation, ultrafiltration or the like. As the hydrophobic organic solvent, hydrocarbons, ketones, esters and the like can be used. The hydrocarbons include aromatic hydrocarbons such as toluene or xylene, etc., the ketones include methyl ethyl ketone, methyl isobutyl ketone, et., and the esters include methyl acetate, butyl acetate, etc.

In addition, as the solvents, a plasticizer may be used, thereby a sol in which the surface-modified anhydrous zinc antimonate or metal oxide is dispersed in the plasticizer can be obtained. The plasticizer is not specifically limited, and includes polyether ester, phosphoric acid ester, phthalic acid ester, aliphatic acid ester or the like. Among the plasticizers, the followings are preferably used: for example triethylene glycol di-2-ethylbutylate (3GH), triethylene glycol di-2-ethylhexanoate (3GO), triethylene glycol di-n-heptanoate (3G7), triethylene glycol di-caprylate, triethylene glycol di-n-octanoate, tetraethylene glycol di-2-ethylbutylate, tetraethylene glycol di-n-heptanoate, dioctylphthalate (DOP), dihexyladipate, dibenzylphthalate and the like. The plasticizer can be alone or a mixture of two or more.

The sol according to the present invention can be produced by firstly producing an anhydrous zinc antimonate aqueous sol or metal oxide aqueous sol, then replacing the aqueous medium of the aqueous sol with a hydrophilic organic solvent, and thereafter replacing the hydrophilic organic solvent with a hydrophobic organic solvent or a plasticizer. Consequently, a sol containing a hydrophobic organic solvent as a dispersing medium or a sol containing a plasticizer as a dispersing medium can be produced. Depending on the kind of the plasticizer used, it may be required to replace a hydrophobic organic solvent with a plasticizer.

The mixing and stirring of anhydrous zinc antimonate sol or metal oxide sol with an aluminum-containing substance, a polymer type surfactant or both of them can lead the surface modification of the anhydrous zinc antimonate colloidal particles or metal oxide particles that the surface thereof is coated with the aluminum-containing substance, the polymer type surfactant or both of them. Although either the aluminum-containing substance or the polymer type surfactant exerts a good effect, better effect is exerted by use of both of them. Addition order of the aluminum-containing substance and the polymer type surfactant is not specifically limited, and it is preferable to add firstly the aluminum-containing substance.

The aluminum-containing substance, polymer type surfactant or both of them may be added in at least one step in a series of steps of: producing an aqueous sol, replacing the aqueous medium of the aqueous sol with a hydrophilic organic solvent, and replacing the hydrophilic organic solvent of the hydrophilic organic solvent sol with a hydrophobic organic solvent or a plasticizer. Generally, it is preferable to add the aluminum-containing substance, polymer type surfactant or both of them after the step replacing the aqueous medium of the anhydrous zinc antimonate aqueous sol or metal oxide aqueous sol with a hydrophilic organic solvent.

The surface-modified anhydrous zinc antimonate colloidal particles of the present invention obtained by using anhydrous zinc antimonate colloidal particles as nuclei, and by coating the surface of the nuclei with aluminum-containing substance, polymer type surfactant or both of them has a molar ratio $ZnO/Sb_2O_5$ of 0.8 to 1.2 and a primary particle diameter of 5 to 500 nm, preferably 5 to 50 nm from the observation with electron microscope. The dried product of the surface-modified anhydrous zinc antimonate sol has a volume resistivity of 0.1 kΩ·cm to 1 MΩ·cm. And, the dried product of the surface-modified metal oxide sol has a volume resistivity of 0.1 kΩ·cm to 1 MΩ·cm.

The sol of the present invention in which the surface-modified anhydrous zinc antimonate colloidal particles or metal oxide colloidal particles are dispersed in an organic solvent such as alcohol or hydrocarbon, wherein the colloidal particles are obtained by using anhydrous zinc antimonate colloidal particles or metal oxide colloidal particles as nuclei, and by coating the surface of the nuclei with an aluminum-containing substance, a polymer type surfactant or both of them can be used as such for several purposes such as transparent antistatic materials in the form of resin, plastic, glass, paper, magnetic tape or the like, transparent UV absorbing materials, transparent heat radiation absorbing materials, high refractive index hard coating agent, anti-reflective agent and the like.

The surface-modified anhydrous zinc antimonate sol or metal oxide sol can be used as a transparent antistatic agent, a coat agent having antistatic properties, a transparent electromagnetic wave shielding agent, an electrically viscous fluid or the like by mixing it with silicon compounds, methacrylates polymerizable with activated energy radiation, resin emulsions, water soluble polymer solutions, silicone oil, coatings or the like.

The silicon compounds include for example the following Component A and/or Component B:

Component A: the organic silicon compounds of formula (I) and the hydrolyzed products thereof:

(I)

wherein $R^1$ and $R^3$ are independently an organic group selected from the group consisting of alkyl groups, alkenyl groups, aryl groups, acyl groups, halogen atoms, glycidoxy groups, epoxy groups, amino groups, phenyl groups, mercapto groups, methacryloxy groups and cyano groups, $R^2$ is an organic group selected from the group consisting of alkyl groups having 1 to 8 carbon atoms, alkoxy groups, acyl groups and phenyl groups, and a and b are an integer of 0 or 1; and Component B: the organic silicon compounds of formula (II) and the hydrolyzed products thereof:

$$[(OX)_{3-a}Si(R^4)]_2Y \qquad (II)$$

wherein $R^4$ is an organic group having 1 to 5 carbon atoms,
X is an alkyl group having 1 to 4 carbon atoms or an acyl group having 1 to 4 carbon atoms,
Y is an organic group having 2 to 20 carbon atoms, and a is an integer of 0 or 1.

Component A is represented by formula (I), and concrete examples of the organic silicon compounds and the hydrolyzed products thereof include methyl silicate, ethyl silicate, n-propyl silicate, iso-propyl silicate, n-butyl silicate, tetraacetoxy silane, methyl trimethoxy silane, methyl tripropoxy silane, methyl triacetoxy silane, methyl tributoxy silane, methyl tripropoxy silane, methyl triamiroxy silane, methyl triphenoxy silane, methyl tribenzyloxy silane, methyl triphenethyloxy silane, glycidoxy methyl trimethoxy silane, glycidoxy methyl trimethoxy silane, α-glycidoxy ethyl trimethoxy silane, α-glycidoxy triethoxy silane, β-glycidoxy trimethoxy silane, β-glycidoxy ethyl triethoxy silane, α-glycidoxy propyl trimethoxy silane, α-glycidoxy propyl triethoxy silane, β-glycidoxy propyl trimethoxy silane, β-glycidoxy propyl triethoxy silane, γ-glycidoxy propyl trimethoxy silane, γ-glycidoxy propyl triethoxy silane, γ-glycidoxy propyl tripropoxy silane, γ-glycidoxy propyl tributoxy silane, γ-glycidoxy propyl triphenoxy silane, α-glycidoxy butyl trimethoxy silane, α-glycidoxy butyl triethoxy silane, β-glycidoxy butyl triethoxy silane, γ-glycidoxy butyl trimethoxy silane, γ-glycidoxy butyl triethoxy silane, δ-glycidoxy butyl trimethoxy silane, δ-glycidoxy butyl triethoxy silane, (3,4-epoxycyclohexyl) methyl trimethoxy silane, (3,4-epoxycyclohexyl) methyl triethoxy silane, β-(3,4-epoxycyclohexyl) ethyl trimethoxy silane, β-(3,4-epoxycyclohexyl) ethyl triethoxy silane, β-(3,4-epoxycyclohexyl) ethyl tripropoxy silane, β-(3,4-epoxycyclohexyl) ethyl tributoxy silane, β-(3,4-epoxycyclohexyl) ethyl triphenoxy silane, γ-(3,4-epoxycyclohexyl) propyl trimethoxy silane, γ-(3,4-epoxycyclohexyl) propyl triethoxy silane, δ-(3,4-epoxycyclohexyl) butyl trimethoxy silane, δ-(3,4-epoxycyclohexyl) butyl triethoxy silane, glycidoxy methyl methyl dimethoxy silane, glycidoxy methyl methyl diethoxy silane, α-glycidoxy ethyl methyl dimethoxy silane, α-glycidoxy ethyl methyl diethoxy silane, β-glycidoxy ethyl methyl dimethoxy silane, β-glycidoxy ethyl ethyl dimethoxy silane, α-glycidoxy propyl methyl dimethoxy silane, α-glycidoxy propyl methyl diethoxy silane, β-glycidoxy propyl methyl dimethoxy silane, β-glycidoxy propyl ethyl dimethoxy silane, γ-glycidoxy propyl methyl dimethoxy silane, γ-glycidoxy propyl methyl diethoxy silane, γ-glycidoxy propyl methyl dipropoxy silane, γ-glycidoxy propyl methyl dibutoxy silane, γ-glycidoxy propyl methyl diphenoxy silane, γ-glycidoxy propyl ethyl diethoxy silane, γ-glycidoxy propyl ethyl diethoxy silane, γ-glycidoxy propyl vinyl methoxy silane, γ-glycidoxy propyl vinyl ethoxy silane, γ-glycidoxy propyl vinyl phenyl methoxy silane, γ-glycidoxy propyl vinyl phenyl ethoxy silane, ethyl trimethoxy silane, ethyl triethoxy silane, vinyl trimethoxy silane, vinyl triacetoxy silane, vinyl trimethoxy ethoxy silane, phenyl trimethoxy silane, phenyl triethoxy silane, phenyl triacetoxy silane, γ-chloro propyl trimethoxy silane, γ-chloro propyl triethoxy silane, γ-chloro propyl triacetoxy silane, 3,3,3-trifluoro propyl trimethoxy silane, γ-methacryloxy propyl trimethoxy silane, γ-mercapto propyl triethoxy silane; γ-mercapto propyl triethoxy silane, β-cyano ethyl triethoxy silane, chloro methyl trimethoxy silane, chloro methyl triethoxy silane, N-(β-aminoethyl) γ-aminopropyl trimethoxy silane, N-(β-aminoethyl) γ-aminopropyl methyl dimethoxy silane, γ-aminopropyl methyl trimethoxy silane, N-(β-aminoethyl) γ-aminopropyl triethoxy silane, N-(β-aminoethyl) γ-aminopropyl methyl diethoxy silane, dimethyl dimethoxy silane, phenyl methyl dimethoxy silane, dimethyl diethoxy silane, phenyl methyl diethoxy silane, γ-chloro propyl methyl dimethoxy silane, γ-chloro propyl methyl diethoxy silane, dimethyl diacetoxy silane, γ-methacryloxy propyl methyl dimethoxy silane, γ-methacryloxy propyl methyl diethoxy silane, γ-mercapto propyl methyl dimethoxy silane, γ-mercapto methyl diethoxy silane, methyl vinyl dimethoxy silane, methyl vinyl diethoxy silane, etc., and the hydrolyzed products thereof.

Next, Component B is described. Component B is represented by formula (II), and concrete examples of the organic silicon compounds and the hydrolyzed products thereof include methylene bismethyl dimethoxy silane, ethylene bisethyl dimethoxy silane, propylene bisethyl diethoxy silane, butylene bismethyl diethoxy silane, etc., and the hydrolyzed products thereof.

As to the organic silicon compounds of Components A and B, only Component A or B may be used alone, or they may be used in a mixture of Components A and B. In the meanwhile, it is natural that Components A may be used in a mixture of two or more kinds of them, and Component B may be used in a mixture similarly.

Hydrolysis of the organic silicon compounds of Components A and B is carried out by adding an acidic aqueous solution such as an aqueous solution of hydrochloric acid, sulfuric acid or acetic acid in the organic silicon compounds of Components A and B and then stirring.

The methacrylates polymerizable with activated energy radiation may be arbitrarily selected from methacrylates which have one or more methacryloyl groups in the molecule and are curable with ultraviolet light or electron beam, and they may be used alone or in a mixture thereof. The concrete examples of the methacrylates include 2-hydroxyethyl methacrylate, 2-hydroxypropyl methacrylate, isobutyl methacrylate, t-butyl methacrylate, isobutyl methacrylate, 2-ethylhexyl methacrylate, stearyl acrylate, 2-ethylhexyl carbitol acrylate, ω-carboxy polycaprolactone monoacrylate, acryloyl oxyethyl acid, acrylic acid dimer, lauryl methacrylate, 2-methoxyethyl acrylate, butoxyethyl acrylate, ethoxy ethoxyethyl acrylate, methoxy triethylene glycol acrylate, methoxy polyethylene glycol acrylate, stearyl methacrylate, cyclohexyl methacrylate, tetrahydrofurfuryl methacrylate, N-vinyl-2-pyrrolidone, isobonyl methacrylate, dicyclopentenyl acrylate, benzyl acrylate, phenyl glycidylether epoxy acrylate, phenoxyethyl methacrylate, phenoxy polyethylene glycol acrylate, nonylphenol ethoxylated acrylate, acryloyoxyethyl phthalic acid, tribromophenyl acrylate, tribromophenol ethoxylated methacrylate, methyl methacrylate, tribromophenyl methacrylate, methacryloyloxy ethyl acid, methacryloyloxyethyl maleic acid, methacryloyloxyethyl phthalic acid, polyethylene glycol methacrylate, polypropylene glycol methacrylate, β-carboxyethyl acrylate, N-methylol acrylamide, N-methoxymethyl acrylamide, N-ethoxymethyl acrylamide, N-n-butoxymethyl acrylamide, t-butylacrylamide sulfonic acid, vinyl stearate, N-methylacrylamide, N-dimethylacrylamide, N-dimethylaminoethyl methacrylate, N-dimethylaminopropyl acrylamide, acryloyl morpholine, glycidyl methacrylate, n-butyl methacrylate, ethyl methacrylate, allyl methacrylate, cetyl methacrylate, pentadecyl methacrylate, methoxy polyethylene glycol methacrylate, diethyl aminoethyl methacrylate, methacryloyloxyethyl succinate, hexane diol diacrylate, neopentyl glycol diacrylate, triethylene glycol diacrylate, polyethylene glycol diacrylate, poly-propylene glycol diacrylate, neopentyl hydroxypivalic acid ester, pentaerythritol diacrylate monostearate, glycol diacrylate, 2-hydroxyethyl methacryloyl phosphate, bisphenol A ethylene glycol adduct acrylate, bisphenol F ethylene glycol adduct acrylate, tricyclodecane methanol diacrylate, trishydroxyethyl isocyanurate diacrylate, 2-hydroxy-1-acryloxy-3-methacryloxy propane, trimethylol propane triacrylate, trimethylol propane ethylene glycol adduct triacrylate, trimethylol propane propylene glycol adduct triacrylate, pentaerythritol triacrylate, trisacryloyloxy ethyl phosphate, trishydroxy ethyl isocyanurate triacrylate, modified ε-caprolactone triacrylate, trimethylol propane ethoxy triacrylate, glycerin propylene glycol adduct trisacrylate, pentaerythritol tetra-acrylate, pentaerythritol ethylene glycol adduct tetra-acrylate, ditrimethylol propane tetra-acrylate, dipentaerythritol hexapenta-acrylate, dipentaerythritol monohydroxy penta-acrylate, urethane acrylate, epoxidized acrylate, polyester acrylate, unsaturated polyester and the like, and the present invention is not limited to them. They may be used alone or in an arbitrary mixture thereof, but a polyfunctional methacrylate monomer or an oligomer which contains two or more methacryloyl groups in the molecule is preferable and suitable as the coating film after polymerization is hard and excellent in mar-proof properties.

EXAMPLES

Example 1

First 110 kg of diantimony trioxide (manufactured by Guangdong Mikuni Antimony Industries Co., Ltd.) and 3.3 kg of basic zinc carbonate (manufactured by Sakai Chemical Industry Co., Ltd.; $3ZnCO_3 \cdot 4Zn(OH)_2$, containing 70 wt % in term of ZnO) were dispersed in 1364 kg of water and then 182 kg of 35% hydrogen peroxide solution and 594 kg of 87% formic acid were added therein, warmed to 90 to 100° C., and reacted for 2 hours to obtain a diantimony pentoxide sol. The resulting sol had a specific gravity of 1.174, pH 1.44, a viscosity of 1.88 mPa·s, $Sb_2O_5$ concentration of 16.3 wt %, a primary particle diameter with transmission electron microscope observation of 20 to 30 nm and a specific surface area based on BET method of 41.3 m$^2$/g.

After 334 kg of the obtained diantimony pentoxide sol was diluted with pure water to $Sb_2O_5$ concentration of 13.3 wt %, 16.9 kg of basic zinc carbonate (manufactured by Sakai Chemical Industry Co., Ltd.; $3ZnCO_3 \cdot 4Zn(OH)_2$, containing 70 wt % in term of ZnO) was added, and thereafter stirred for 6 hours to obtain a slurry. The slurry had ZnO concentration of 3.1%wt, $Sb_2O_5$ concentration of 12.7 wt %, and a molar ratio $ZnO/Sb_2O_5$ of 0.97. The slurry was dried with a spray-dryer to obtain dried powder. X-diffraction measurements showed that peaks of the dried powder coincided with those of hydrate diantimony pentoxide ($Sb_2O_5/xH_2O$).

After 72 kg of the dried powder was fed into a fluidized bed of 450 mmφ, the powder was calcined at 480° C. for 4 hours by providing a mixed gas with water vapor/nitrogen gas partial pressure ratio of 0.47 prepared by bubbling air in a flow rate of 24 Nm$^3$/hr in a warm bath at 85° C. The resulting powder showed dark blue color and X-diffraction measurements showed that peaks thereof coincided with those of anhydrous zinc antimonate ($ZnSb_2O_5$). In addition, the product press molded at 300 kg/cm$^2$ from the powder had a specific resistivity of 150 Ω·cm.

After the resulting powder was ground with a pin disc mill, 84 kg of the ground powder and 320 kg of water were added in a 20 L wet-grinder (LMK-20 type grinder manufactured by Ashizawa Ltd.) and wet-grinding was carried out with glass beads (0.3 mmφ) and an aqueous sol was obtained with water-driving. The aqueous sol had pH 6.6. The aqueous sol was subjected to cation exchange by passing it through a column in which 50 L of a cation exchange resin was packed at a passing rate of SV=12. Then, the aqueous sol was subjected to anion exchange by passing it through a column in which 50 L of an anion exchange resin was packed at a passing rate of SV=12. The ion exchanged sol had pH 3.1. To the aqueous sol, 400 g of di-isopropyl amine was added, the resulting aqueous sol was concentrated by use of an ultrafiltration apparatus to 258 kg. The obtained anhydrous zinc antimonate aqueous sol showed dark blue color having transparency and had a specific gravity of 1.353, pH 6.94, a viscosity of 2.8 mPa·s, an electric conductivity of 409 Ps/cm, and $ZnSb_2O_6$ concentration of 30.6 wt %. The sol had a primary particle diameter with transmission electron microscope observation of 15 to 50 nm, and particle diameter of the aggregated product was 97 nm with particle diameter distribution analyzer based on laser diffractometry and 60 nm with centrifugal sedimentation particle diameter distribution analyzer. The dried product of the sol had a specific surface area based on the BET method of 63.9 m$^2$/g and a particle diameter calculated from the specific surface area of 15 nm.

The aqueous solvent of the anhydrous zinc antimonate colloidal solution was replaced with methanol solvent by blowing methanol vapor under normal pressure. The resulting sol containing methanol as solvent contained $ZnSb_2O_6$ in a concentration of 61.5 wt %, and a solution obtained by mixing with water in a weight ratio of 1:1 had pH 7.3. The sol had a primary particle diameter with transmission electron microscope observation of 10 to 20 nm, and particle diameter of the aggregated product was 110 nm with particle diameter distribution analyzer based on laser diffractometry and 40 nm with centrifugal sedimentation particle diameter distribution analyzer. The dried product of the sol had a volume resistivity of 1480 Ω·cm.

To 155 g of the sol containing methanol as solvent, 60 g of methyl ethyl ketone was added with stirring, and then 47.8 g of 10 wt % solution of aluminum chelating agent corresponding to formula (4) (trade name: Alumichelate OL-1000 manufactured by Kawaken Fine Chemicals Co., Ltd., composed of aluminum mono-isopropoxy mono-oleoxyethylacetoacetate) in methyl ethyl ketone was added with stirring, and the resulting mixture was stirred and mixed at room temperature for 1 hour. Further, 47.8 g of 10 wt % solution of polymer type surfactant corresponding to formula (9) (trade name: Disperplast-1148 manufactured by BYK Chemie) in methyl ethyl ketone was added with stirring, and the resulting mixture was stirred and mixed at room temperature for 1 hour. Thereby, an anhydrous zinc antimonate colloidal solution in which the particle surface of the colloidal particles was coated with an aluminum-containing substance and a polymer type surfactant was obtained. The methanol solvent of the surface-modified anhydrous zinc antimonate colloidal solution was replaced with methyl ethyl ketone by a rotary evaporator to produce the surface-modified anhydrous zinc antimonate sol containing methyl ethyl ketone as solvent. The obtained sol containing methyl ethyl ketone as solvent contained ZnO.Sb$_2$O$_5$ in a concentration of 31.0 wt %, and the coated amount of the aluminum chelating agent was 0.6 wt % in term of Al$_2$O$_3$ based on ZnO.Sb$_2$O$_5$ and the coated amount of the polymer type surfactant was 3.5 wt % based on ZnO.Sb$_2$O$_5$, and a solution obtained by mixing with water in a weight ratio of 1:1 had pH 7.4. The sol had a primary particle diameter with transmission electron microscope observation of 10 to 20 nm, and particle diameter of the aggregated product was 126 nm with particle diameter distribution analyzer based on laser diffractometry. As the particle diameter of the aggregated product in solvent with a high boiling point (methyl ethyl ketone) was close to the primary particle diameter, it was confirmed that the resulting sol showed a satisfactory dispersion even in a solvent with a high boiling point. In addition, the dried product of the sol had a volume resistivity of 2518 Ω·cm.

Example 2

To 153 g of the sol of the anhydrous zinc antimonate containing methanol as solvent used in Example 1 mentioned above, 77 g of methyl ethyl ketone was added with stirring, and then 28.2 g of 10 wt % solution of aluminum chelating agent corresponding to formula (4) (trade name: Alumichelate OL-1000 manufactured by Kawaken Fine Chemicals Co., Ltd., composed of aluminum mono-isopropoxy mono-oleoxyethylacetoacetate) in methyl ethyl ketone was added with stirring, and the resulting mixture was stirred and mixed at room temperature for 1 hour. Further, 47.0 g of 10 wt % solution of polymer type surfactant corresponding to formula (9) (trade name: Disperplast-1148 manufactured by BYK Chemie) in methyl ethyl ketone was added with stirring, and the resulting mixture was stirred and mixed at room temperature for 1 hour. Thereby, a anhydrous zinc antimonate colloidal solution in which the particle surface of the colloidal particles was coated with an aluminum-containing substance and a polymer type surfactant was obtained. The methanol solvent of the surface-modified anhydrous zinc antimonate colloidal solution was replaced with methyl ethyl ketone by a rotary evaporator to produce the surface-modified anhydrous zinc antimonate sol containing methyl ethyl ketone as solvent. The obtained sol containing methyl ethyl ketone as solvent contained ZnO.Sb$_2$O$_5$ in a concentration of 31.4 wt %, and the coated amount of the aluminum chelating agent was 0.3 wt % in term of Al$_2$O$_3$ based on ZnO.Sb$_2$O$_5$ and the coated amount of the polymer type surfactant was 3.5 wt % based on ZnO.Sb$_2$O$_5$, and a solution obtained by mixing with water in a weight ratio of 1:1 had pH 7.1. The sol had a primary particle diameter with transmission electron microscope observation of 10 to 20 nm, and particle diameter of the aggregated product was 120 nm with particle diameter distribution analyzer based on laser diffractometry. The dried product of the sol had a volume resistivity of 2172 Ω·cm. As the particle diameter of the aggregated product in solvent with a high boiling point (methyl ethyl ketone) was close to the primary particle diameter, it was confirmed that the resulting sol showed a satisfactory dispersion even in a solvent with a high boiling point.

Example 3

To 155 g of the sol of the anhydrous zinc antimonate containing methanol as solvent used in Example 1 mentioned above, 68 g of toluene was added with stirring, and then 47.7 g of 10 wt % solution of aluminum chelating agent corresponding to formula (4) (trade name: Alumichelate OL-1000 manufactured by Kawaken Fine Chemicals Co., Ltd., composed of aluminum mono-isopropoxy mono-oleoxyethylacetoacetate) in toluene was added with stirring, and the resulting mixture was stirred and mixed at room temperature for 1 hour. Further, 47.8 g of 10 wt % solution of polymer type surfactant corresponding to formula (9) (trade name: Disperplast-1148 manufactured by BYK Chemle) in toluene was added with stirring, and the resulting mixture was stirred and mixed at room temperature for 1 hour. Thereby, a anhydrous zinc antimonate colloidal solution in which the particle surface of the colloidal particles was coated with an aluminum-containing substance and a polymer type surfactant was obtained. The methanol solvent of the surface-modified anhydrous zinc antimonate colloidal solution was replaced with toluene by a rotary evaporator to produce the surface-modified anhydrous zinc antimonate sol containing toluene as solvent. The obtained sol containing toluene as solvent contained ZnO.Sb$_2$O$_5$ in a concentration of 42.1 wt %, and the coated amount of the aluminum chelating agent was 0.6 wt % in term of Al$_2$O$_3$ based on ZnO.Sb$_2$O$_5$ and the coated amount of the polymer type surfactant was 3.5 wt % based on ZnO.Sb$_2$O$_5$. The sol had a primary particle diameter with transmission electron microscope observation of 10 to 20 nm, and particle diameter of the aggregated product was 120 nm with particle diameter distribution analyzer based on laser diffractometry. As the particle diameter of the aggregated product in solvent with a high boiling point (toluene) was close to the primary particle diameter, it was confirmed that the resulting sol showed a satisfactory dispersion even in a solvent with a high boiling point.

Example 4

To 155 g of the sol of the anhydrous zinc antimonate containing methanol as solvent used in Example 1 mentioned above, 115 g of toluene was added with stirring, and then 47.7 g of 10 wt % solution of aluminum chelating agent corresponding to formula (4) (trade name: Alumichelate OL-1000 manufactured by Kawaken Fine Chemicals Co., Ltd., composed of aluminum mono-isopropoxy mono-oleoxyethylacetoacetate) in toluene was added with stirring, and the resulting mixture was stirred and mixed at room temperature for 1 hour. Thereby, a anhydrous zinc antimonate colloidal solution in which the particle surface of the colloidal particles was coated with an aluminum-containing substance was obtained. The methanol solvent of the surface-modified anhydrous zinc antimonate colloidal solution was replaced with toluene by a rotary evaporator to produce the surface-modified anhydrous zinc antimonate sol containing toluene as solvent. The obtained sol containing toluene as solvent contained ZnO.Sb$_2$O$_5$ in a concentration of 41.0 wt %, and the coated amount of the aluminum chelating agent was 0.6 wt % in term of Al$_2$O$_3$ based on ZnO.Sb$_2$O$_5$. The sol had a primary particle diameter with transmission electron microscope observation of 10 to 20 nm, and particle diameter of the aggregated product was 126 nm with particle diameter distribution analyzer based on laser diffractometry. As the particle diameter of the aggregated product in solvent with a high boiling point (toluene) was close to the primary particle diameter, it was confirmed that the resulting sol showed a satisfactory dispersion even in a solvent with a high boiling point.

Example 5

To 142.6 g of the sol of the anhydrous zinc antimonate containing methyl ethyl ketone as solvent having the surface coating of the compounds of formulae (4) and (9) obtained in Example 1 mentioned above, 255 g of triethylene glycol di-2-ethylhexanoate (3GO) was added with stirring, and the resulting mixture was stirred and mixed at room temperature for 30 minutes. The methyl ethyl ketone solvent of the surface-modified anhydrous zinc antimonate colloidal solution was distilled off to produce a sol of the surface-modified anhydrous zinc antimonate containing 3GO as solvent. The obtained sol containing 3GO as solvent contained $ZnO.Sb_2O_5$ in a concentration of 15.0 wt %, and the coated amount of the aluminum chelating agent was 0.6 wt % in term of $Al_2O_3$ based on $ZnO.Sb_2O_5$, and the coated amount of the polymer type surfactant was 3.5 wt % based on $ZnO.Sb_2O_5$. The sol had a primary particle diameter with transmission electron microscope observation of 10 to 20 nm, and particle diameter of the aggregated product was 130 nm with particle diameter distribution analyzer based on laser diffractometry. As the particle diameter of the aggregated product in a plasticizer (3GO) was close to the primary particle diameter, it was confirmed that the resulting sol showed a satisfactory dispersion even in the plasticizer.

Example 6

To 109.8 g of the sol of the anhydrous zinc antimonate containing toluene as solvent having the surface coating of the compounds of formulae (4) and (9) obtained in Example 3 mentioned above, 255 g of triethylene glycol di-2-ethylhexanoate (3GO) was added with stirring, and the resulting mixture was stirred and mixed at room temperature for 30 minutes. The toluene solvent of the surface-modified anhydrous zinc antimonate colloidal solution was distilled off to produce a sol of the surface-modified anhydrous zinc antimonate containing 3GO as solvent. The obtained sol containing 3GO as solvent contained $ZnO.Sb_2O_5$ in a concentration of 15.0 wt %, and the coated amount of the aluminum chelating agent was 0.6 wt % in term of $Al_2O_3$ based on $ZnO.Sb_2O_5$, and the coated amount of the polymer type surfactant was 3.5 wt % based on $ZnO.Sb_2O_5$. The sol had a primary particle diameter with transmission electron microscope observation of 10 to 20 nm, and particle diameter of the aggregated product was 110 nm with particle diameter distribution analyzer based on laser diffractometry. As the particle diameter of the aggregated product in a plasticizer (3GO) was close to the primary particle diameter, it was confirmed that the resulting sol showed a satisfactory dispersion even in the plasticizer.

Example 7

After 694.5 kg of the diantimony pentoxide sol used in Example 1 mentioned above was diluted with pure water to $Sb_2O_5$ concentration of 14 wt %, 3.1 kg of metastannic acid (manufactured by Showa Kako Corporation, containing 86 wt % in term of $SnO_2$) was added and the resulting mixture was stirred for 1 hour, and then 34 kg of 35% hydrogen peroxide solution and 0.33 kg of formic acid were added, and then 37.3 kg of basic zinc carbonate (manufactured by Sakai Chemical Industry Co., Ltd.; $3ZnCO_3.4Zn(OH)_2$, containing 72.5 wt % in term of ZnO), thereafter stirred for 4 hours to obtain a slurry. The slurry had a molar ratio $SnO_2:ZnO:Sb_2O_5$ of 0.05:0.97:1.00 when it was charged. The slurry was dried with a spray-dryer to obtain dried powder.

After 72 kg of the dried powder was fed into a fluidized bed of 450 mmφ, the powder was calcined at 480° C. for 4 hours by providing a mixed gas with water vapor/air partial pressure ratio of 0.47 prepared by bubbling air in a flow rate of 24 $Nm^3/hr$ in a warm bath at 85° C. The resulting powder showed dark blue color and it was confirmed that the powder had a rutile-type structure from the results of X-ray diffraction measurements. The metal oxide particles were composed of tin atom, zinc atom, antimony atom and oxygen atom, and had as a molar ratio $SnO_2:ZnO:Sb_2O_5$ of 0.05:0.97:1.00. The metal oxide had a rutile-type structure and was tin oxide-doped zinc antimonate of $[(ZnO)_{0.97}(Sb_2O_5)_{1.00}]_{1.00}(SnO_2)_{0.05}$. In addition, the product press molded at 300 kg/$cm^2$ from the powder had a specific resistivity of 58 Ω·cm.

After the resulting powder was ground with a pin disc mill, 6 kg of the ground powder and 24 kg of water were added in a 4 L wet-grinder (LMK-4 type grinder manufactured by Ashizawa Ltd.) and wet-grinding was carried out with glass beads (0.3 mmφ) and an aqueous sol was obtained with water-driving. The aqueous sol was subjected to cation exchange by passing it through a column in which 3 L of a cation exchange resin was packed at a passing rate of SV=12. Then, the aqueous sol was subjected to anion exchange by passing it through a column in which 3 L of an anion exchange resin was packed at a passing rate of SV=12. The ion exchanged sol had pH 3.1. To the aqueous sol, 30 g of di-isopropyl amine was added, the resulting aqueous sol was concentrated by use of an ultrafiltration apparatus to 19.5 kg. The obtained metal oxide aqueous sol showed dark blue color having transparency and had a specific gravity of 1.353, pH 6.59, a viscosity of 1.7 mPa·s, an electric conductivity of 367 μs/cm, and $[(ZnO)_{0.97}(Sb_2O_5)_{1.00}]_{1.00}(SnO_2)_{0.05}$ concentration of 30.8 wt %. The sol had a primary particle diameter with transmission electron microscope observation of 15 to 50 nm, and particle diameter of the aggregated product was 92 nm with particle diameter distribution analyzer based on laser diffractometry and 60 nm with centrifugal sedimentation particle diameter distribution analyzer. The dried product of the sol had a specific surface area based on the BET method of 53.8 $m^2/g$ and a particle diameter calculated from the specific surface area of 18 nm.

The aqueous solvent of the metal oxide colloidal solution was replaced with methanol solvent by blowing methanol vapor under normal pressure. The resulting sol containing methanol as solvent contained $[(ZnO)_{0.97}(Sb_2O_5)_{1.00}]_{1.00}(SnO_2)_{0.05}$ in a concentration of 61.1 wt %, and a solution obtained by mixing with water in a weight ratio of 1:1 had pH 7.1. The sol had a primary particle diameter with transmission electron microscope observation of 15 to 50 nm, and particle diameter of the aggregated product was 83 nm with particle diameter distribution analyzer based on laser diffractometry and 50 nm with centrifugal sedimentation particle diameter distribution analyzer. The dried product of the sol had a volume resistivity of 280 Ω·cm.

To 73.7 g of the sol containing methanol as solvent, 31.3 g of methyl ethyl ketone was added with stirring, and then 45.0 g of 10 wt % solution of aluminum chelating agent corresponding to formula (4) (trade name: Alumichelate M manufactured by Kawaken Fine Chemicals Co., Ltd., composed of octadecyl acetoacetate aluminum di-isopropylate) in methyl ethyl ketone was added with stirring, and the resulting mixture was stirred and mixed at room temperature for 1 hour. Further, 45.0 g of 10 wt % solution of polymer type surfactant corresponding to formula (9) (trade name: Disperbyk-163 manufactured by BYK Chemie) in methyl ethyl ketone was added with stirring, and the resulting mixture was stirred and mixed at room temperature for 1 hour. Thereby, a metal oxide colloidal solution in which the particle surface of the colloidal particles was coated with an aluminum-containing substance and a polymer type surfactant was obtained. The methanol solvent of the surface-modified metal oxide colloidal solution was replaced with methyl ethyl ketone solvent by a rotary evaporator to produce the surface-modified metal oxide sol containing methyl ethyl ketone as solvent. The obtained sol containing methyl ethyl ketone as solvent contained [(Zn O)$_{0.97}$(Sb$_2$O$_5$)$_{1.00}$]$_{1.00}$(SnO$_2$)$_{0.05}$ in a concentration of 31.0 wt %, and the coated amount of the aluminum chelating agent was 1.0 wt % in term of Al$_2$O$_3$ based on [(ZnO)$_{0.97}$(Sb$_2$O$_5$)$_{1.00}$]$_{1.00}$(SnO$_2$)$_{0.05}$, and the coated amount of the polymer type surfactant was 4.4 wt % based on [(ZnO)$_{0.97}$(Sb$_2$O$_5$)$_{1.00}$]$_{1.00}$(SnO$_2$)$_{0.05}$. The sol had a primary particle diameter with transmission electron microscope observation of 15 to 50 nm, and particle diameter of the aggregated product was 105 nm with particle diameter distribution analyzer based on laser diffractometry. As the particle diameter of the aggregated product in solvent with a high boiling point (methyl ethyl ketone) was close to the primary particle diameter, it was confirmed that the resulting sol showed a satisfactory dispersion even in a solvent with a high boiling point.

Example 8

To 144.4 g of the sol of the metal oxide containing methyl ethyl ketone as solvent having the surface coating of the compounds of formulae (4) and (9) obtained in Example 7 mentioned above, 246 g of triethylene glycol di-2-ethylhexanoate (3GO) was added with stirring, and the resulting mixture was stirred and mixed at room temperature for 30 minutes. The methyl ethyl ketone solvent of the surface-modified metal oxide colloidal solution was distilled off to produce a sol of the surface-modified metal oxide containing 3GO as solvent. The obtained sol containing 3GO as solvent contained [(ZnO)$_{0.97}$(Sb$_2$O$_5$)$_{1.00}$]$_{1.00}$(SnO$_2$)$_{0.05}$ in a concentration of 15.0 wt %, and the coated amount of the aluminum chelating agent was 1.0 wt % in term of Al$_2$O$_3$ based on [(ZnO)$_{0.97}$(Sb$_2$O$_5$)$_{1.00}$]$_{1.00}$(SnO$_2$)$_{0.05}$, and the coated amount of the polymer type surfactant was 4.4 wt % based on [(ZnO)$_{0.97}$(Sb$_2$O$_5$)$_{1.00}$]$_{1.00}$(SnO$_2$)$_{0.05}$. The sol had a primary particle diameter with transmission electron microscope observation of 15 to 50 nm, and particle diameter of the aggregated product was 99 nm with particle diameter distribution analyzer based on laser diffractometry. As the particle diameter of the aggregated product in a plasticizer (3GO) was close to the primary particle diameter, it was confirmed that the resulting sol showed a satisfactory dispersion even in the plasticizer.

Comparative Example 1

To 1060 g of conventional aqueous sol of anhydrous zinc antimonate (containing ZnO.Sb$_2$O$_5$ in a concentration of 22.7 wt %, pH 3.9), 4.09 g of methyltrimethoxy silane (trade name: SZ6070 manufactured by Dow Corning Toray Company, Limited) was added, and the resulting mixture was stirred and mixed at room temperature for 4 hours with a disperser. Then, 0.48 g of di-isopropylamine was added thereto, and further 1.20 g of malic acid was added thereto, and the resulting mixture was stirred and mixed at room temperature for 3 hours with a disperser. Thereby, anhydrous zinc antimonate colloidal solution that the particle surface was coated with methyltrimethoxy silane or hydrolysis product thereof was obtained. The colloidal solution had pH 3.4. The aqueous solvent of the surface-modified anhydrous zinc antimonate colloidal solution was replaced with methanol solvent by a rotary evaporator, and then with isopropyl alcohol solvent, and further with methyl ethyl ketone solvent to produce a methyl ethyl ketone sol of the surface-modified anhydrous zinc antimonate. The obtained methyl ethyl ketone sol contained ZnO.Sb$_2$O$_5$ in a concentration of 19.8 wt %, and the coated amount of the silane coupling agent was 0.7 wt % in term of SiO$_2$ based on ZnO.Sb$_2$O$_5$. The sol had a primary particle diameter with transmission electron microscope observation of 10 to 20 nm, and particle diameter of the aggregated product was 286 nm with particle diameter distribution analyzer based on laser diffractometry. As the particle diameter of the aggregated product in solvent with a high boiling point (methyl ethyl ketone) was significantly apart from the primary particle diameter, it was confirmed that the resulting sol was not satisfactorily dispersed in a solvent with a high boiling point.

What is claimed is:

1. A sol in which surface-modified anhydrous zinc antimonate colloidal particles are dispersed in a liquid, wherein the surface-modified anhydrous zinc antimonate colloidal particles are obtained by using anhydrous zinc antimonate colloidal particles as nuclei, and by coating the surface of the nuclei with an aluminum-containing substance or an aluminum containing substance and a polymer type surfactant, wherein the aluminum containing substance is chelated aluminum.

2. The sol according to claim 1, wherein the anhydrous zinc antimonate is coated with the aluminum-containing substance in an amount of 0.01 to 50% by weight in term of Al$_2$O$_3$ based on the anhydrous zinc antimonate.

3. A sol in which surface-modified metal oxide colloidal particles are dispersed in a liquid, wherein the surface-modified metal oxide colloidal particles are obtained by using as nuclei metal oxide particles comprising tin atom, zinc atom, antimony atom and oxygen atom, and having as molar ratio SnO$_2$:ZnO:Sb$_2$O$_5$ of 0.01-1.00:0.80-1.20:1.00, and by coating the surface of the nuclei with an aluminum-containing substance or an aluminum containing substance and a polymer type surfactant, wherein the aluminum containing substance is chelated aluminum.

4. The sol according to claim 1, wherein the aluminum-containing substance is a compound of formula (1), (2) or (3):

(1)

(2)

(3)

wherein R$_1$, R$_2$ and R$_3$ are organic groups.

5. The sol according to claim 1, wherein the aluminum-containing substance is a compound of formula (4), (5) or (6):

(4)

-continued

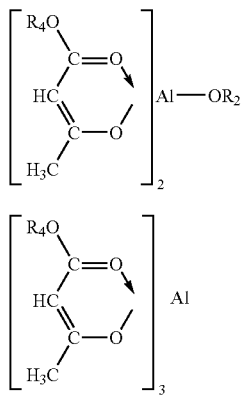

wherein $R_2$ and $R_3$ are organic groups, and $R_4$ is alkyl group.

6. The sol according to claim 1, wherein the polymer type surfactant is at least one selected from the group consisting of polycarboxylic acid ester type surfactants and polyethylene glycol monoaliphatic acid ester type surfactants.

7. The sol according to claim 1, wherein the anhydrous zinc antimonate is coated with the polymer type surfactant in an amount of 0.1 to 50% by weight based on the anhydrous zinc antimonate.

8. The sol according to claim 1, wherein the polymer type surfactant is a substance having a structure of formula (7):

wherein n1 is an integer of 1 to 20, or a substance of formula (8):

wherein n2 is an integer of 1 to 20.

9. The sol according to claim 1, wherein a dispersing medium is a hydrophobic organic solvent or a plasticizer.

10. A process for producing the sol according to claim 1, comprising the steps of: mixing a sol with an aluminum-containing substance or an aluminum containing substance and a polymer type surfactant, and stirring the resulting mixture.

11. The process according to claim 10, which comprises mixing an aluminum-containing substance or an aluminum containing substance and a polymer type surfactant, in at least one step in a series of steps of: producing an aqueous sol, replacing the aqueous solvent of the aqueous sol with a hydrophilic organic solvent, and replacing the hydrophilic organic solvent of the hydrophilic organic solvent sol with a hydrophobic organic solvent or a plasticizer.

12. The sol according to claim 3, wherein the metal oxide is coated with the aluminum-containing substance in an amount of 0.01 to 50% by weight in term of $Al_2O_3$ based on the metal oxide.

13. The sol according to claim 3, wherein the metal oxide has a rutile-type structure, and is tin oxide-doped zinc antimonate of a formula:

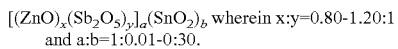

14. The sol according to claim 3, wherein the aluminum-containing substance is a compound of formula (1), (2) or (3):

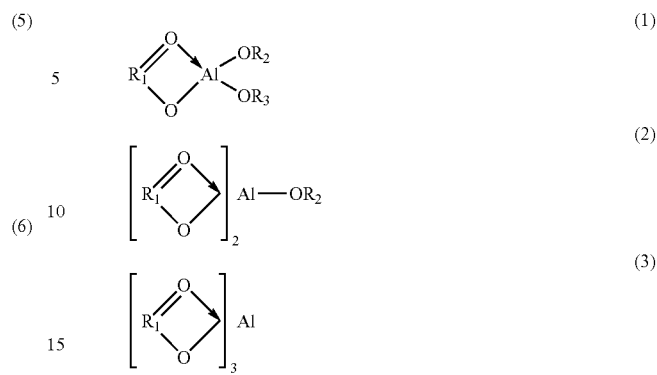

wherein $R_1$, $R_2$ and $R_3$ are organic groups.

15. The sol according to claim 3, wherein the aluminum-containing substance is a compound of formula (4), (5) or (6):

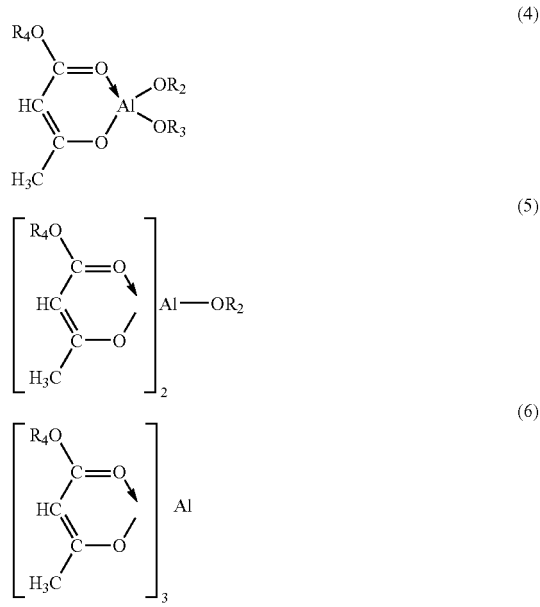

wherein $R_2$ and $R_3$ are organic groups, and $R_4$ is alkyl group.

16. The sol according to claim 3, wherein the polymer type surfactant is at least one selected from the group consisting of polycarboxylic acid ester type surfactants and polyethylene glycol monoaliphatic acid ester type surfactants.

17. The sol according to claim 3, wherein the metal oxide is coated with the polymer type surfactant in an amount of 0.1 to 50% by weight based on the metal oxide.

18. The sol according to claim 3, wherein the polymer type surfactant is a substance having a structure of formula (7):

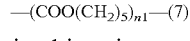

wherein n1 is an integer of 1 to 20, or a substance of formula (8):

wherein n2 is an integer of 1 to 20.

19. The sol according to claim 3, wherein a dispersing medium is a hydrophobic organic solvent or a plasticizer.

20. A process for producing the sol according to claim 3, comprising the steps of: mixing a sol with an aluminum-containing substance or an aluminum containing substance and a polymer type surfactant, and stirring the resulting mixture.

21. The process according to claim 20, which comprises mixing an aluminum-containing substance or an aluminum containing substance and a polymer type surfactant, in at least one step in a series of steps of: producing an aqueous sol, replacing the aqueous solvent of the aqueous sol with a hydrophilic organic solvent, and replacing the hydrophilic organic solvent of the hydrophilic organic solvent sol with a hydrophobic organic solvent or a plasticizer.

* * * * *